US012768473B1

(12) United States Patent
McClellan et al.

(10) Patent No.: US 12,768,473 B1
(45) Date of Patent: Oct. 20, 2026

(54) CABLE TIE INSULATOR

(71) Applicant: ConcealFab, Inc., Colorado Springs, CO (US)

(72) Inventors: Flynn McClellan, Colorado Springs, CO (US); Jonathan Morris, Colorado Springs, CO (US)

(73) Assignee: ConcealFab, Inc., Colorado Springs, CO (US)

( * ) Notice: Subject to any disclaimer, the term of this patent is extended or adjusted under 35 U.S.C. 154(b) by 22 days.

(21) Appl. No.: 19/012,020

(22) Filed: Jan. 7, 2025

(51) Int. Cl.
*F16L 3/13* (2006.01)
*F16L 3/137* (2006.01)

(52) U.S. Cl.
CPC .................................... *F16L 3/137* (2013.01)

(58) Field of Classification Search
CPC ........................................................ F16L 3/137
See application file for complete search history.

(56) References Cited

U.S. PATENT DOCUMENTS 3,618,173 A * 11/1971 Schwartz ........... B65D 63/1081 24/16 PB
3,860,997 A * 1/1975 Van Riper, Jr. .... B65D 63/1081 24/16 PB
RE31,689 E * 10/1984 Bulanda ................ F16L 3/2332 248/74.5
4,631,783 A * 12/1986 Hayashi ............... F16M 13/022 24/30.5 S
5,402,971 A * 4/1995 Bower ..................... H02G 3/32 248/74.3
5,690,522 A * 11/1997 Moreau ..................... F16L 1/24 441/1
6,105,908 A * 8/2000 Kraus ..................... F16L 3/233 248/74.3
6,256,847 B1 * 7/2001 Manley ................ A44B 11/258 24/593.11
10,703,548 B2 * 7/2020 Swatko .............. B65D 63/1072
11,159,006 B2 10/2021 Heath et al.
11,181,210 B2 11/2021 Rajpal et al.
11,187,351 B2 11/2021 Bell et al.
D964,151 S 9/2022 Bell et al.
D964,945 S 9/2022 Bell et al.
11,621,548 B2 4/2023 Heath et al.
11,708,918 B1 7/2023 Bell et al.
11,883,612 B2 * 1/2024 Albertsen ............. A61M 25/02
11,916,366 B2 2/2024 Heath et al.
2003/0167602 A1 * 9/2003 Thompson ............... H02G 3/30 24/16 PB (Continued)

*Primary Examiner* — David M Upchurch
(74) *Attorney, Agent, or Firm* — Mehrman Law Office; Michael J. Mehrman

(57) ABSTRACT

A cable tie-down assembly includes a cable tie anchor secured to a support structure. A cable tie insulator is positioned around one or more cables, and a cable tie extends through the cable tie anchor and around the cable tie insulator with the cable tie insulator positioned between the cable tie and the one or more cables to prevent chafing between the cable tie and the one or more cables. The cable tie insulator includes a cable tie channel with the cable tie positioned in the channel to restrain movement of the cable tie with respect to the cable tie insulator. The head of the cable tie insulator includes a fitting receiving a portion of the cable tie anchor to restrain movement of the cable tie insulator with respect to the cable tie anchor.

19 Claims, 9 Drawing Sheets

(56) References Cited

U.S. PATENT DOCUMENTS

| | | | | |
|---|---|---|---|---|
| 2005/0273983 | A1* | 12/2005 | Mattchen | A61B 17/82 24/136 R |
| 2009/0077772 | A1* | 3/2009 | Tomasetti | B65D 63/10 24/16 PB |
| 2018/0163900 | A1* | 6/2018 | Vaughn | F16L 5/00 |
| 2021/0048050 | A1* | 2/2021 | Coey | F16M 13/022 |
| 2022/0274541 | A1* | 9/2022 | Velázquez | B60R 16/00 |

* cited by examiner

CABLE TIE INSULATOR

TECHNICAL FIELD

The present invention is directed to cellular communication systems and, more particularly, to a cable tie insulator that avoids cable chafing at cable tie-down points at cellular base station antennas.

BACKGROUND

An essential element of modern mobile communications systems is the "cell site." The cell site includes one or more cellular base station antennas aimed at a desired geographical area of coverage. Cellular base stations include coaxial and other types of cables for exchanging communication and control signals with the antennas. The cables are tied down with cable ties at multiple locations to minimize cable movement caused by wind, ice or other factors. Several cables are often grouped together and tied down at multiple locations as the cables are routed along various structures. A typical group of cables may be tied down at dozens of locations in a typical cellular base station antenna site.

Once tied down, the cables can be exposed to high levels of wind and icing over long periods of time, which causes movement of the cables against the cable ties. Movement of the cables against the cable ties can cause chafing and potential damage to the cables. Replacing cables is extremely expensive and time consuming.

A reliable, inexpensive, easy to deploy, and robust cable support solution is therefore needed to mitigate cable chafing at cellular base station antennas.

SUMMARY

The needs described above are met by a cable tie insulator that prevents chafing between a cable tie and one or more cables secured by the cable tie. A representative cable tie-down assembly includes a cable tie anchor secured to a support structure. A cable tie insulator is positioned around one or more cables, and a cable tie extends through the cable tie anchor and around the cable tie insulator with the insulator positioned between the cable tie and the one or more cables to prevent chafing between the cable tie and the one or more cables.

A representative cable tie insulator includes an elongated strap including a first end, a second end, elongated sides between the first and second ends, and a restrainer along the strap. A head attached to the first end of the strap includes a slot for receiving the second end of the strap through the head with a portion of the strap extending through the head forming a loop. The head of the cable tie insulator includes a retainer for engaging the restrainer of the strap to retain the strap in the head with the loop extending around one or more cables. The strap receives a cable tie extending through the cable tie anchor and wrapped around the cable tie insulator with the cable tie insulator disposed between the one or more cables and the cable tie to prevent chafing between the cable tie and the one or more cables.

In a representative embodiment, the restrainer includes serrations along the elongated sides of the strap, and the retainer includes protrusions for engaging the serrations. The strap may also include a cable tie channel for receiving the cable tie to restrain movement of the cable tie with respect to the cable tie insulator. In addition, the head of the cable tie insulator may include a fitting for receiving a portion of a cable tie anchor to restrain movement of the cable tie insulator with respect to the cable tie anchor.

It will be understood that specific embodiments may include a variety of features and options in different combinations, as may be desired by different users. Practicing the invention does not require utilization of all, or any particular combination, of these specific features or options. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION OF REPRESENTATIVE EMBODIMENTS

Embodiments of the invention include a cable tie insulator and a cable tie-down assembly to mitigate chafing between a cable tie and one or more cables secured to a support structure by the by the cable tie. A representative cable tie-down assembly includes a cable tie anchor secured to a support structure. The cable tie insulator is positioned around one or more cables, and a cable tie extends through the cable tie anchor and around the cable tie insulator with the insulator positioned between the cable tie and the one or more cables to prevent chafing between the cable tie and the one or more cables.

In a representative embodiment, the cable tie insulator includes a strap and a head, where the strap includes a restrainer along the strap that engages with a retainer in the head of the insulator to maintain the insulator in a loop around the cables. For example, the restrainer may be serrations along the elongated edges of the strap, and the retainer may be protrusions in the head of the cable tie insulator. The cable tie insulator may also include a cable tie channel that receives the cable tie to restrain movement of the cable tie with respect to the cable tie insulator. In addition, the head of the cable tie insulator may include a fitting that receives a portion of a cable tie anchor to restrain movement of the cable tie insulator with respect to the cable tie anchor. The cable tie insulator may be softer (lower durometer) than the cable tie to avoid chafing between the cable tie insulator and the cable tie.

Figure 1:
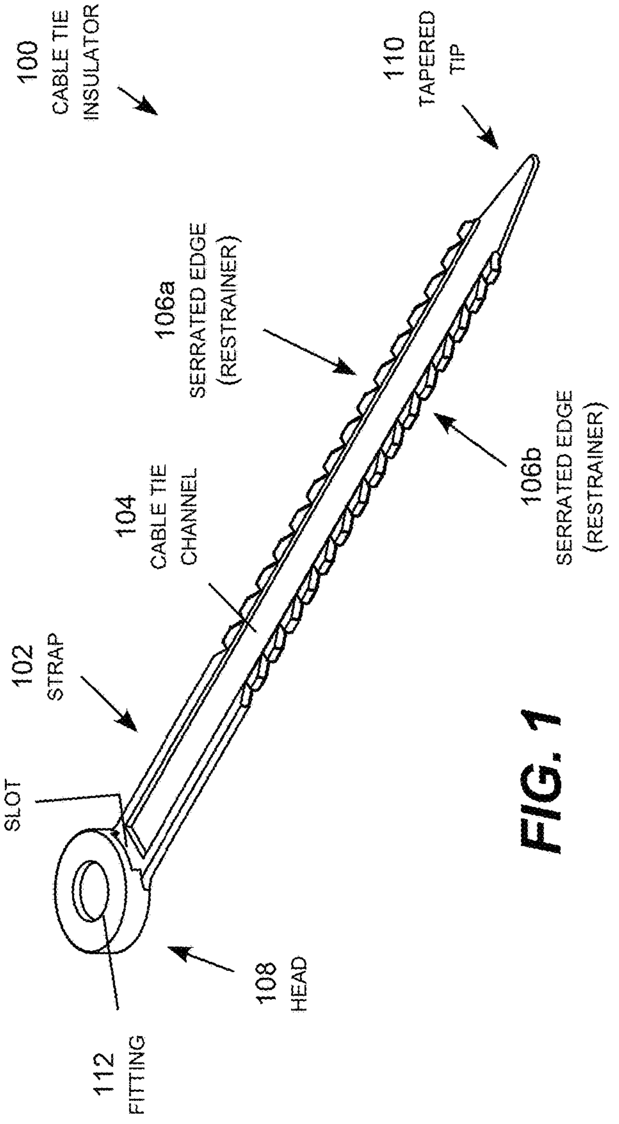
FIG. 1 is a perspective view of a cable tie insulator.
Figure 2:
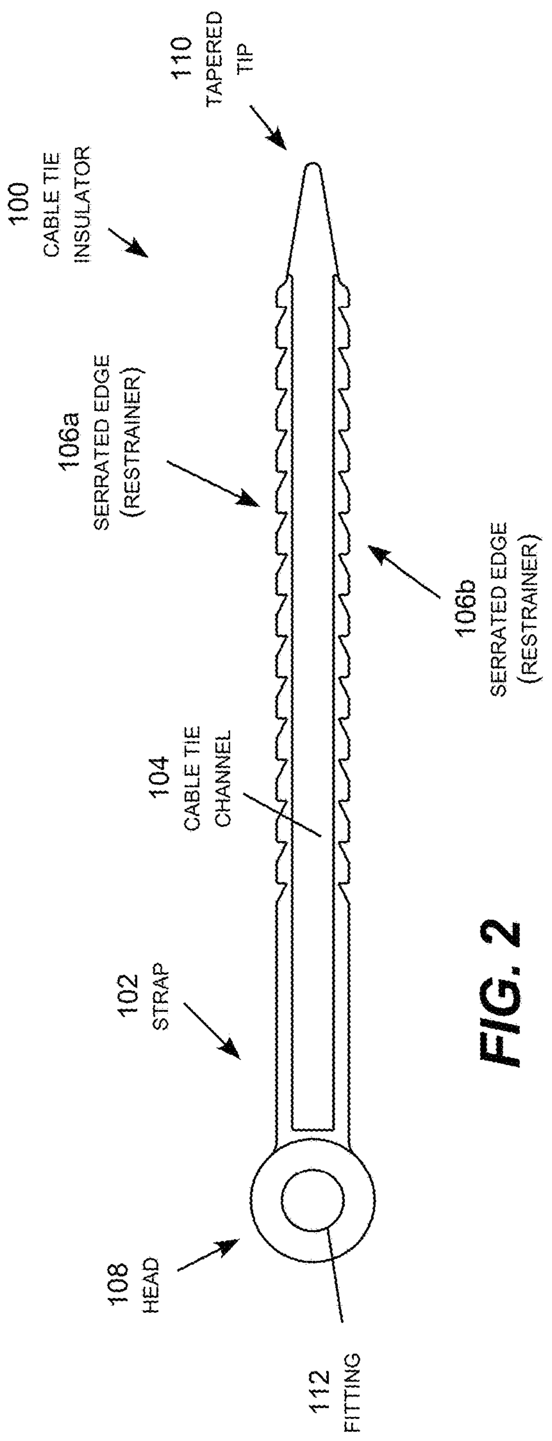
FIG. 2 is a top view of the cable tie insulator.
Figure 3:
FIG. 3 is a side view of the cable tie insulator.
Figure 4:
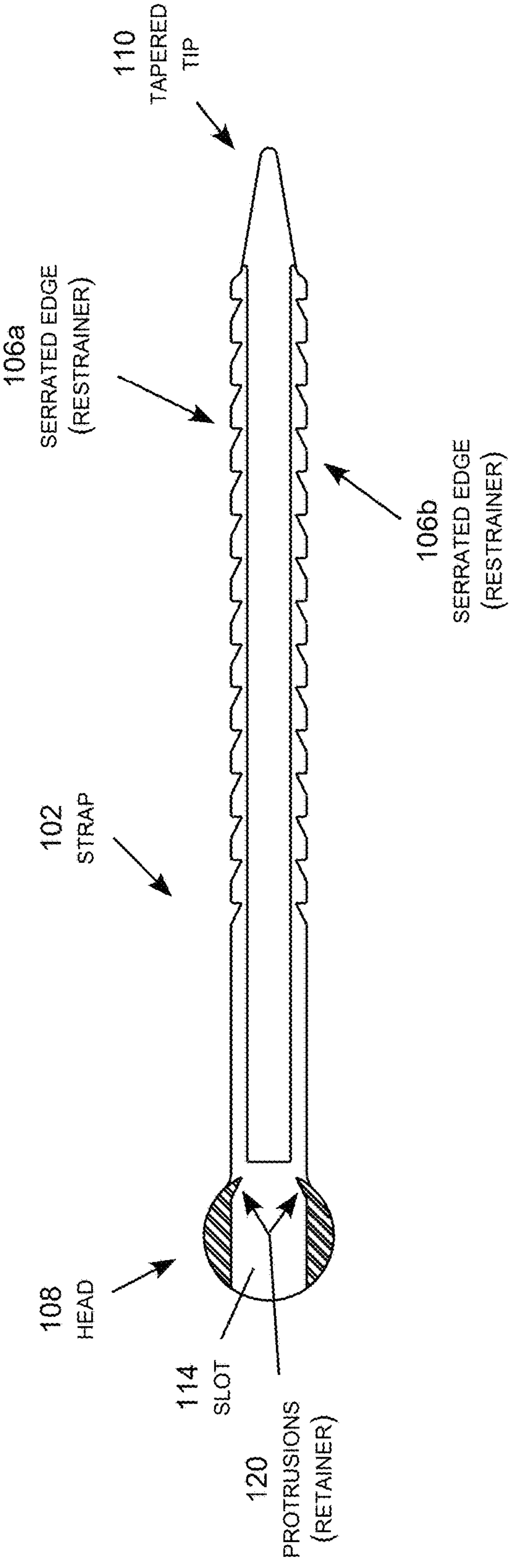
FIG. 4 is a cross-sectional view of the cable tie insulator.

FIG. 1 is a perspective view, FIG. 2 is a top view, FIG. 3 is a side view, and FIG. 4 is a cross-sectional view of a representative embodiment, cable tie insulator 100, designed to prevent chafing between a cable tie and one or more cables secured to a support structure by the cable tie. This example cable tie insulator 100 includes a strap 102, which defines a cable tie channel 104 and a restrainer, in this example serrated edges 106*a* and 106*b* along the elongated sides of the strap. A first end of the strap 102 is attached to a head 108 and a second end forms a tapered tip 110. The restrainer, in this example serrations 106*a* and 106*b*, engage with a retainer, in this example protrusions 120, in the head 108 of the insulator.

As shown in FIG. 4, the head 108 of the insulator defines a slot 114 that receives the tapered tip 110 of the strap through the slot allowing the strap to form a loop around one or more cables. That is, the cable tie insulator 100 is wrapped around the cables, with the tip 110 of the strap 102 passed through the slot 114 and the cable channel 104 facing outward. The head 108 also forms a fitting 112 that receives a portion of a cable tie anchor referred to as the "button" to restrain movement of the cable tie insulator with respect to the cable tie anchor (see FIGS. 6-7). A cable tie is passed through the cable tie anchor and wrapped around the cable tie insulator with the insulator positioned between the cable tie and the cables (see FIG. 8). The cable tie prevents the cable tie anchor from falling out of the support structure, while also securing the capbes The cable tie is positioned in the cable tie channel 104 to restrain movement of the cable tie with respect to the cable tie insulator 100. In addition, the fitting is received on the button of the cable tie anchor to restrain movement of the cable tie insulator 100 with respect to the cable tie anchor.

FIG. 4 is a cross-sectional view through section A-A shown in FIG. 3 illustrating a retainer in the slot 114 of the head 108 of the cable tie insulator 100 for engaging the strap restrainer 106*a* and 106*b*. In this embodiment, the retainer is a pair of pointed protrusions 120 extending into the slot 114 sized and shaped to engage with the restrainer, in this example serrations 106*a*-106*b* along the elongated edges of the strap, when a length of the strap 102 is passed through the head 108. While serrations 106*a*-106*b* along the edges of strap and protrusions 120 are utilized to secure the cable tie insulator 100 around the cables in the representative embodiments, other types of restraining devices may be utilized. For example, the insulator may be secured in a loop around one or more cables using transverse grooves across the strap and a tab in the head similar to those used in conventional cable ties, one or more holes that receive one or more studs, hook- and loop fastener, buckle, adhesive surface, adhesive tape, etc.

Figure 5:
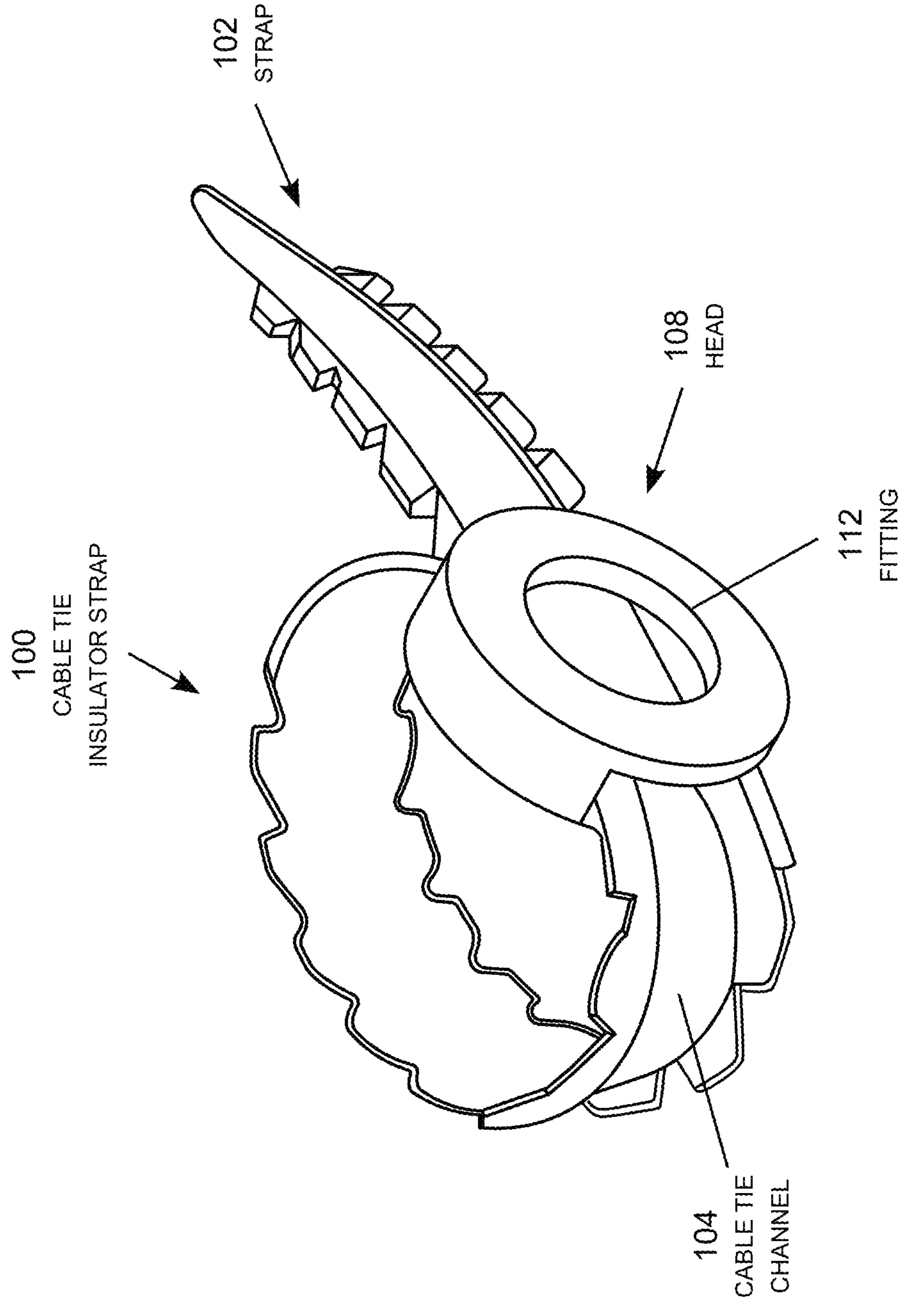
FIG. 5 is a perspective view of a looped cable tie insulator.

As shown in FIG. 5, the cable tie insulator 100 is formed into a loop with the cable tie channel 104 facing outward so that the cable tie can be received in the cable tie channel when the cable tie is wrapped around the cable tie insulator. Although not shown in FIG. 5 for clarity in the depiction of the insulator, the cable tie insulator 100 is wrapped around the cables to be restrained when securing the cables. To accept the cable tie, the cable tie channel 104 faces outward once the cable tie insulator 100 is wrapped into a loop around one or more cables. Similarly, to accept the button of the cable tie anchor, the fitting 112 faces outward once the cable tie insulator 100 is wrapped into a loop around one or more cables.

Figure 6:
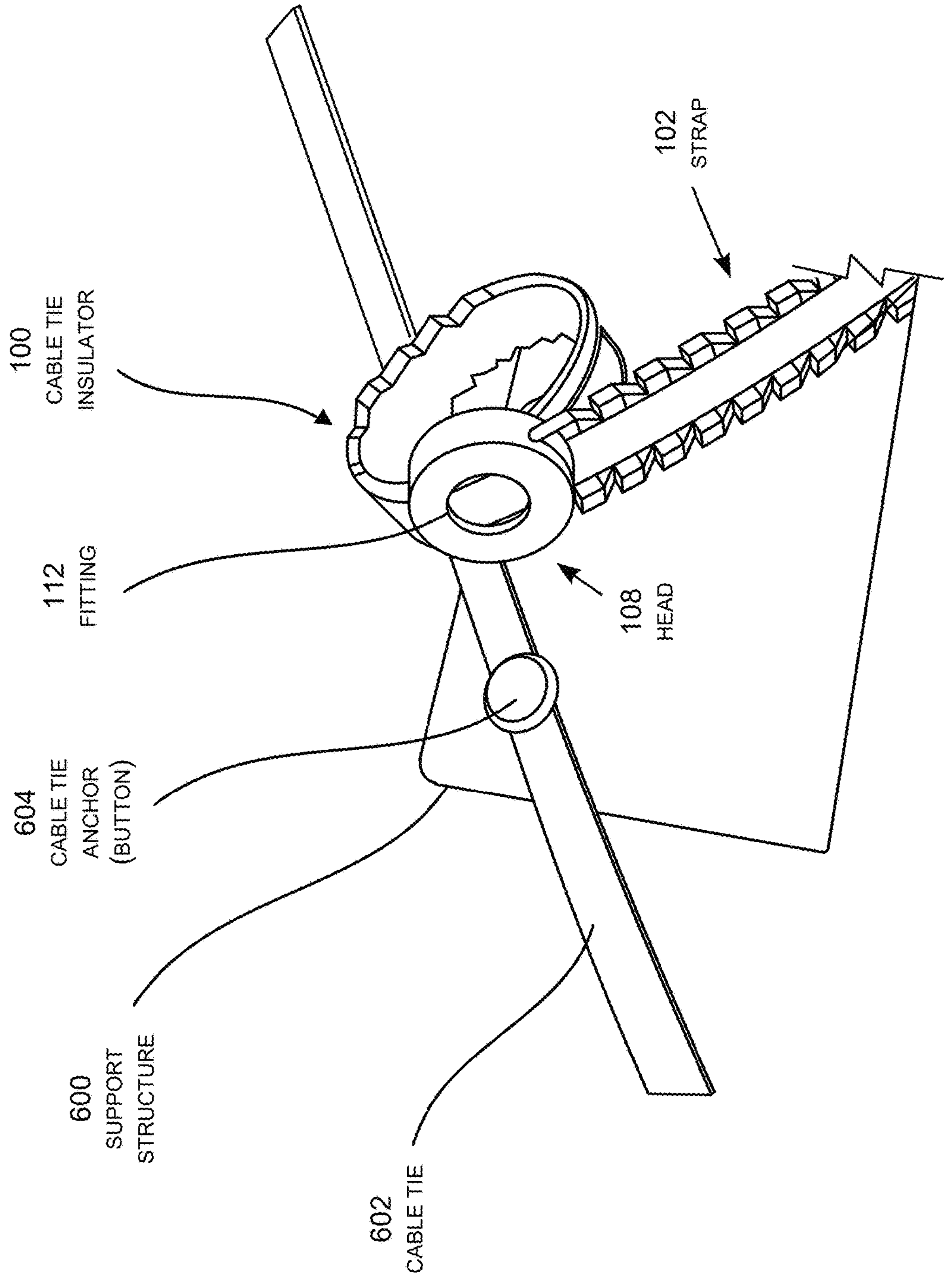
FIG. 6 illustrates a cable tie and a cable tie insulator.
Figure 7:
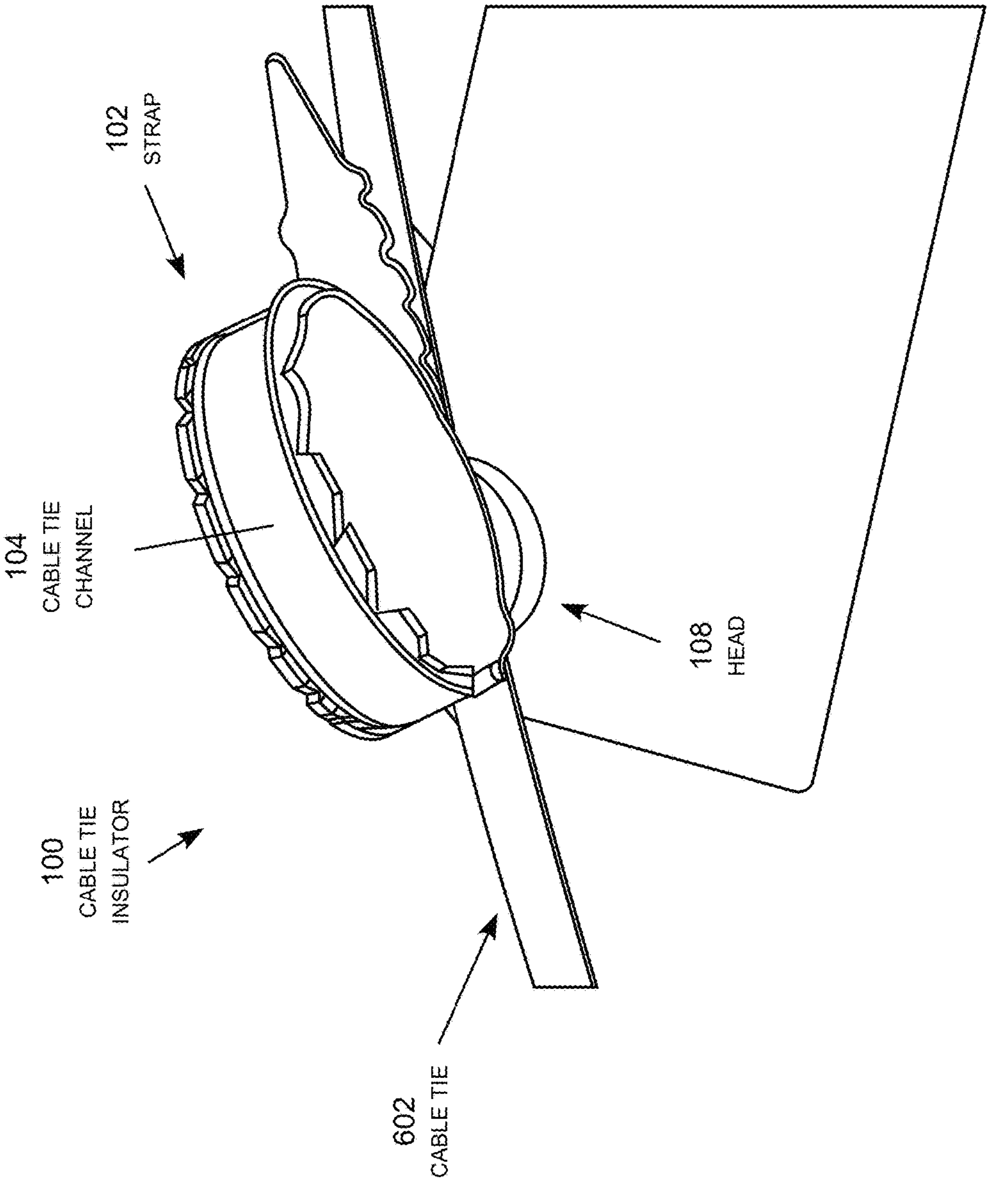
FIG. 7 illustrates positioning the cable tie insulator on a cable tie anchor.

FIG. 6 shows the cable tie insulator 100 together with a cable tie 602 and cable tie anchor 604 secured to a support structure 600, while FIG. 7 illustrates positioning the cable tie insulator on the cable tie anchor prior to trimming the strap and wrapping the cable tie 602 around the cable tie insulator. Passing the cable tie 602 through the cable tie anchor 604 secures the cable tie and cable tie anchor to the support structure 600. As shown in FIG. 6, the cable tie insulator 100 includes a fitting 112, which is sized and shaped to be received on the button portion of the cable the anchor 604. Placing the fitting 112 on the button of the cable tie anchor 604, as shown in FIG. 7, restrains movement of the cable tie insulator 100 with respect to the cable tie anchor 604 once the cable tie 602 is tightened down. A suitable cable tie anchor is shown in U.S. Pat. No. D964,945, which is incorporated by reference.

Figure 8:
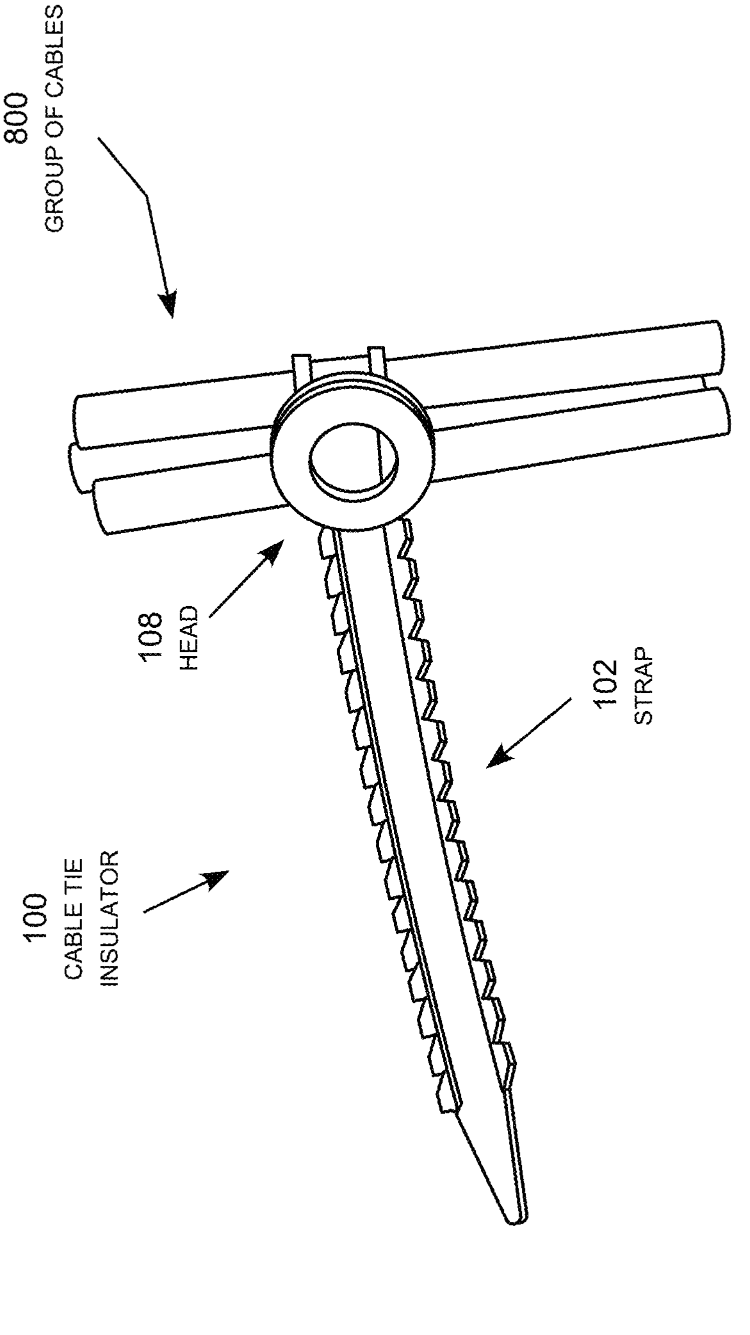
FIG. 8 illustrates the cable tie insulator wrapped around a group of cables.
Figure 9:
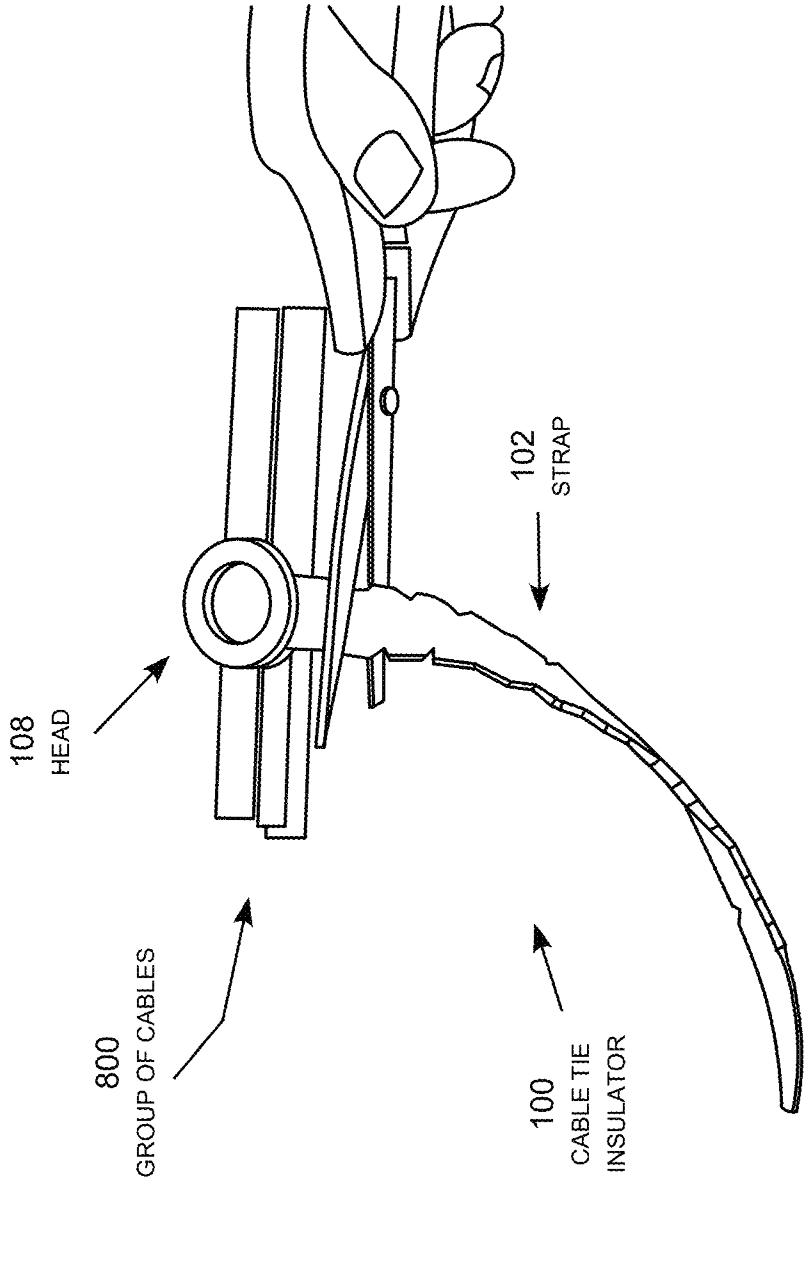
FIG. 9 illustrates trimming the cable tie insulator.
Figure 10:
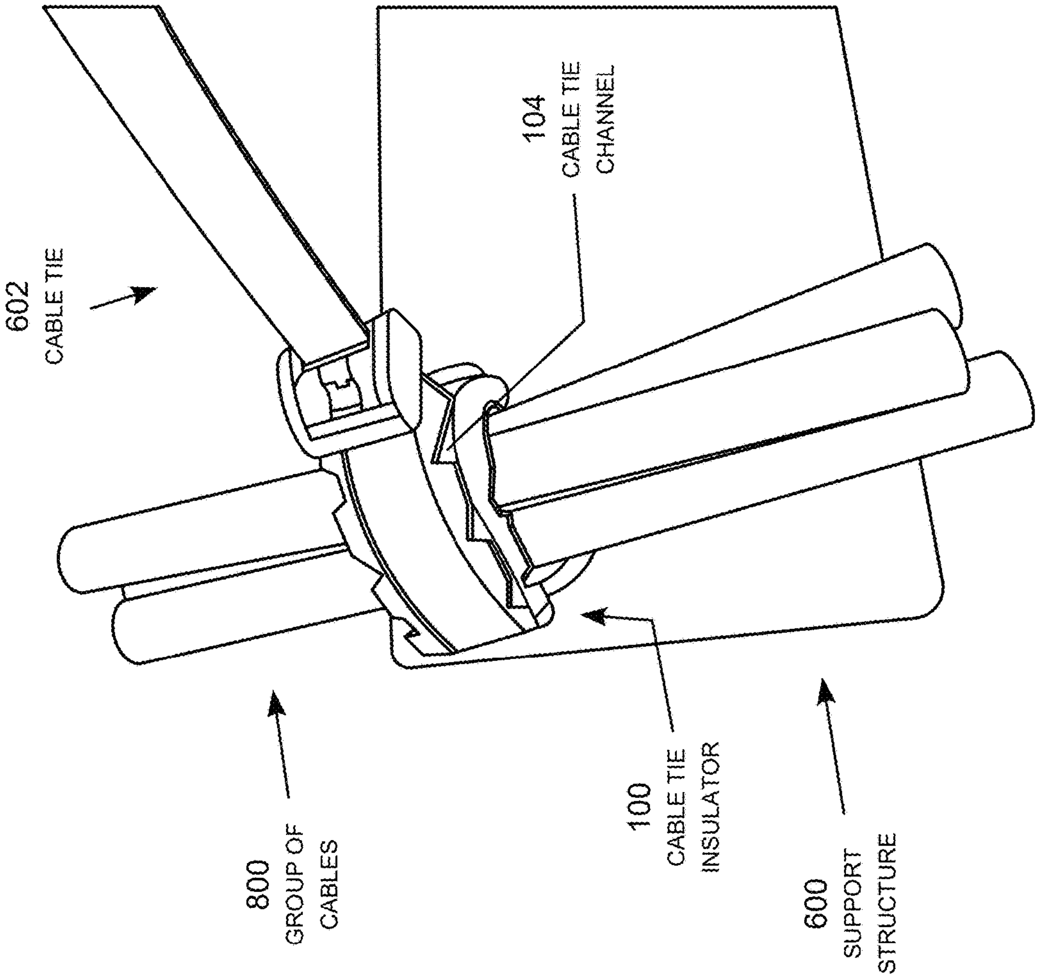
FIG. 10 illustrates a partially installed cable tie insulator.
Figure 11:
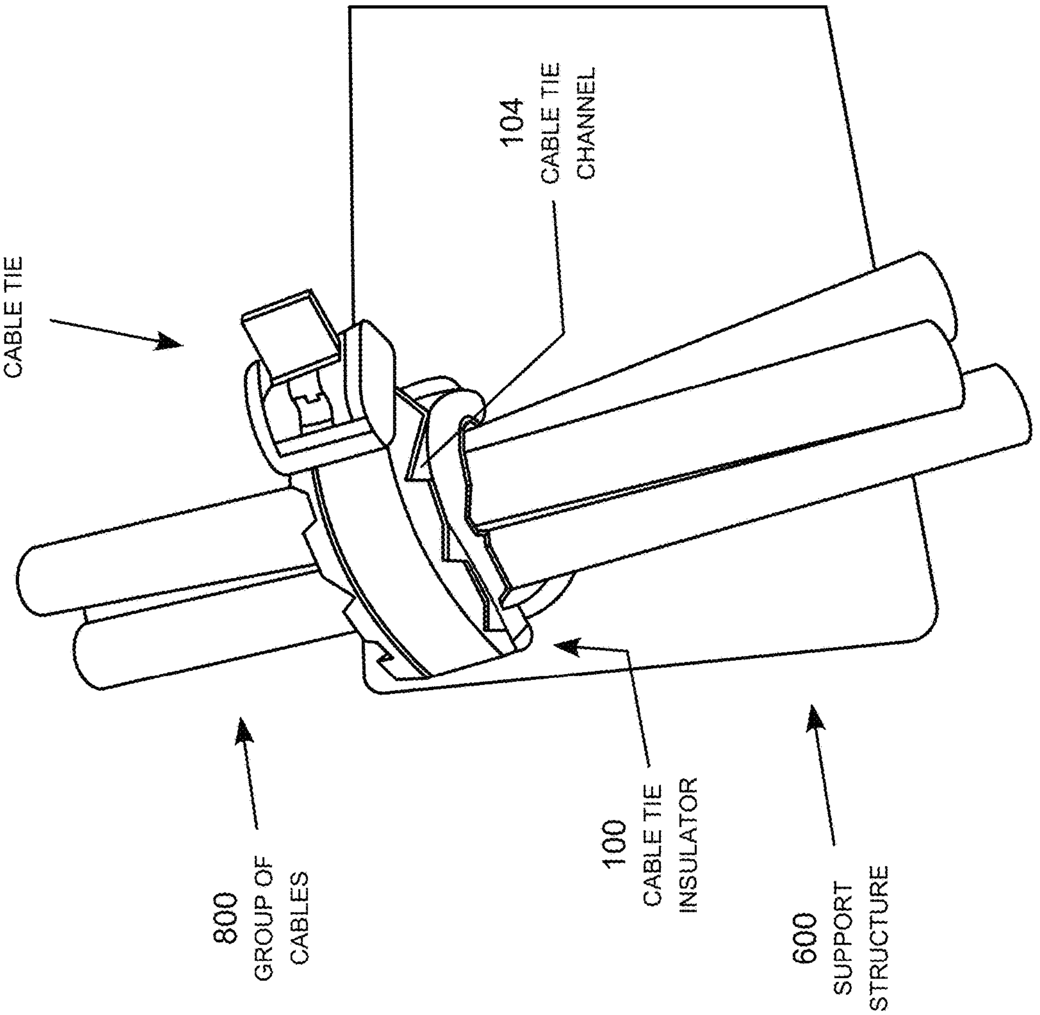
FIG. 11 illustrates an installed cable tie insulator.

FIG. 8 illustrates the cable tie insulator 100 wrapped around a group of cables 800 prior to trimming the excess strap 102 and attaching the cable insulator to a cable tie anchor. FIG. 9 illustrates trimming excess strap after the cable tie insulator 100 has been tightened around the group of cables. FIG. 10 illustrates a partially installed cable tie insulator. The cable tie insulator 100 is looped around one or more cables, represented by the group of cables 800. The cable tie insulator 100 is then tightened around the cables and the excess strap 102 is trimmed. Referring also to FIG. 4, the serrations 106*a*-106*b* (restrainer) are engaged by the protrusions 120 (retainer) to hold the cable tie insulator 100 around the cables 800 while the technician installs the cable tie 602 around the cable tie insulator. The cable tie 602 passes through the cable tie anchor 604 and around the cable tie insulator 100 with the fitting 112 of the cable tie insulator positioned on the button portion of the cable tie anchor 604. The cable tie 602 is then tightened down to secure the cables 800 to the support structure 600. Once the cable tie is tightened, the excess is trimmed to complete the installation. FIG. 11 shows the completed installation after the cable tie 602 has been tightened and the excess trimmed.

It will therefore be appreciated that the cable tie insulator 100 includes multiple features to restrain movement of the insulator with respect to the cable tie and the cable tie anchor once installed. As described with reference to FIGS. 4 and 5, the protrusions 120 (restrainer) engage with the serrated edges 106*a*-106*b* (retainer) to maintain the cable tie anchor in a loop while the technician installs the cable tie around the cable tie insulator 100. As described with reference to FIGS. 6 and 7, the fitting 112 of the cable tie insulator 100 is received on the button of the cable tie anchor 604, which is attached to the support structure 600, to restrain movement of the cable tie insulator 100 with respect to the cable tie anchor 604. In addition, as shown in FIGS. 10 and 11, the cable tie 602 is received in the cable tie channel 104 (shown in FIGS. 1 and 2) to restrain movement of the cable tie 602 with respect to the cable tie insulator 100. These features provide a robust reliable, inexpensive, easy to deploy, and robust cable support solution is therefore needed to mitigate cable chafing at cellular base station antennas.

In general, the cable tie insulator may be softer (i.e., have a lower durometer) than the cable tie. Cable ties are typically fabricated from a relatively hard material, such as acetal or nylon, potentially chafing the cables secured by the cable tie. The cable tie insulator may be fabricated from an elastomeric foam material, such as neoprene, nitrile butadiene rubber (NBR), NBR blend with polyvinyl chloride (NBE/PVC), and ethylene propylene diene monomer (EPDM).

Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A cable tie insulator, comprising:

an elongated strap comprising a first end, a second end, elongated sides between the first and second ends, and a restrainer along the strap;

a head attached to the first end of the strap comprising a slot for receiving the second end of the strap through the head with a portion of the strap extending through the head forming a loop;

the head further comprising a retainer for engaging the restrainer of the strap to retain the strap in the head with the loop extending around one or more cables;

the strap for receiving a cable tie wrapped around the cable tie insulator with the cable tie insulator disposed between the one or more cables and the cable tie to prevent chafing between the cable tie and the one or more cables.

2. The cable tie insulator of claim 1, wherein:

the restrainer comprises serrations along the elongated sides of the strap;

the retainer comprises protrusions for engaging the serrations.

3. The cable tie insulator of claim 1, wherein the strap further comprises a cable tie channel for receiving the cable tie to restrain movement of the cable tie with respect to the cable tie insulator.

4. The cable tie insulator of claim 1, wherein the head of the cable tie insulator further comprises a fitting for receiving a portion of a cable tie anchor to restrain movement of the cable tie insulator with respect to the cable tie anchor.

5. The cable tie insulator of claim 1, wherein the cable tie insulator has a lower durometer than the cable tie.

6. A cable tie-down assembly, comprising:

a cable tie anchor secured to a support structure;

a cable tie insulator positioned around one or more cables;

a cable tie extending through the cable tie anchor and around the cable tie insulator with the cable tie insulator positioned between the cable tie and the one or more cables to prevent chafing between the cable tie and the one or more cables;

wherein the cable tie insulator comprises a head and an elongated strap extending from the head around the cable and engaged with the head forming a loop around the one or more cables.

7. The cable tie-down assembly of claim 6, the elongated strap comprising a first end, a second end, elongated sides between the first and second ends, and a restrainer along the strap;

the head attached to the first end of the strap comprising a slot for receiving the second end of the strap through the head with a portion of the strap extending through the head forming the loop;

the head further comprising a retainer for engaging the restrainer of the strap to retain the strap in the head with the loop extending around the one or more cables.

8. The cable tie-down assembly of claim 7, wherein:

the restrainer comprises serrations along the elongated sides of the strap;

the retainer comprises protrusions for engaging the serrations.

9. The cable tie-down assembly of claim 7, wherein the retainer and restrainer comprise one or more of transverse grooves and a tab, one or more holes that receive one or more studs, hook- and loop fastener, buckle, adhesive surface, and adhesive tape.

10. The cable tie-down assembly of claim 6, wherein the cable tie insulator comprises a cable tie channel, and the cable tie is positioned in the cable tie channel to restrain movement of the cable tie with respect to the cable tie insulator.

11. The cable tie-down assembly of claim 6, wherein the cable tie insulator comprises a fitting receiving a portion of the cable tie anchor to restrain movement of the cable tie insulator with respect to the cable tie anchor.

12. The cable tie-down assembly of claim 6, wherein the cable tie insulator has a lower durometer than the cable tie.

13. A cable tie-down assembly, comprising:

a cable tie insulator comprising an elongated strap comprising a first end, a second end, elongated sides between the first and second ends, and a head attached to the first end of the strap comprising a slot for receiving the second end of the strap through the head with a portion of the strap extending through the head forming a loop;

a cable tie wrapped around the cable tie insulator with the cable tie insulator disposed between the one or more cables and the cable tie to prevent chafing between the cable tie and the one or more cables;

wherein the strap further comprises a cable tie channel for receiving the cable tie to restrain movement of the cable tie with respect to the cable tie insulator.

14. The cable tie-down assembly of claim 13, wherein the cable tie insulator further comprises:

an elongated strap comprising a first end, a second end, elongated sides between the first and second ends, and a restrainer along the strap;

a head attached to the first end of the strap comprising a slot for receiving the second end of the strap through the head with a portion of the strap extending through the head forming a loop;

the head further comprising a retainer for engaging the restrainer of the strap to retain the strap in the head with the loop extending around one or more cables.

15. The cable tie-down assembly of claim 14, wherein:

the restrainer comprises serrations along the elongated sides of the strap;

the retainer comprises protrusions for engaging the serrations.

16. The cable tie-down assembly of claim 14, wherein the retainer and restrainer comprise one or more of transverse grooves and a tab, one or more holes that receive one or more studs, hook- and loop fastener, buckle, adhesive surface, and adhesive tape.

17. The cable tie-down assembly of claim 13, further comprising a cable tie anchor secured to a support structure, wherein the cable tie extends through the cable tie anchor and around the cable tie insulator.

18. The cable tie-down assembly of claim 17, wherein the cable tie insulator further comprises a fitting receiving a portion of the cable tie anchor to restrain movement of the cable tie insulator with respect to the cable tie anchor.

19. The cable tie-down assembly of claim 13, wherein the cable tie insulator has a lower durometer than the cable tie.

* * * * *